US011920638B2

(12) United States Patent
Cooling et al.

(10) Patent No.: US 11,920,638 B2
(45) Date of Patent: Mar. 5, 2024

(54) GENERATOR SHAFT ASSEMBLY

(71) Applicant: Hamilton Sundstrand Corporation, Charlotte, NC (US)

(72) Inventors: Aaron Cooling, Rockford, IL (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 344 days.

(21) Appl. No.: 17/327,065

(22) Filed: May 21, 2021

(65) Prior Publication Data
US 2021/0364048 A1    Nov. 25, 2021

Related U.S. Application Data

(60) Provisional application No. 63/028,501, filed on May 21, 2020.

(51) Int. Cl.
F16D 1/116    (2006.01)
F16B 21/18    (2006.01)

(52) U.S. Cl.
CPC ............ F16D 1/116 (2013.01); F16B 21/183 (2013.01); *Y10T 403/7033* (2015.01)

(58) Field of Classification Search
CPC ...... F16B 21/18; F16B 21/183; F16B 21/186; F16D 1/116; F16D 2001/103; Y10T 403/58; Y10T 403/581; Y10T 403/583; Y10T 403/587; Y10T 403/7033; Y10T 403/7058
USPC ............. 403/315, 316, 317, 319, 359.5, 371
See application file for complete search history.

(56) References Cited

U.S. PATENT DOCUMENTS 3,673,814 A * 7/1972 Carman ................... F16D 3/185
                                                              464/154
4,641,990 A * 2/1987 Geisthoff ................ F16D 1/116
                                                              403/317
4,756,640 A * 7/1988 Gehrke .................... F16B 21/16
                                                              403/359.5
(Continued)

FOREIGN PATENT DOCUMENTS

CN      104595320 A      5/2015
DE       4007941 C1 *   9/1990  .............. F16D 1/116
(Continued)

OTHER PUBLICATIONS

Extended European Search Report dated Oct. 11, 2021, issued during the prosecution of European Patent Application No. EP21175457. 7, 6 pages.

*Primary Examiner* — Josh Skroupa
(74) *Attorney, Agent, or Firm* — Locke Lord LLP; Scott D. Wofsy; Joshua L. Jones

(57) ABSTRACT

A generator shaft assembly including a primary shaft, a disconnect shaft housed within the primary shaft, where a first end of the disconnect shaft is configured to couple with the primary mover and a second end of the disconnect shaft is configured to mate with the generator. A retainer ring housed within the primary shaft having at least a landing and a groove on an inner surface thereof and a retainer member positioned between the landing of the retainer ring and an outer surface of the disconnect shaft configured to limit axial motion of the disconnect shaft relative to the primary shaft.

14 Claims, 3 Drawing Sheets

(56) References Cited

U.S. PATENT DOCUMENTS

| | | | | |
|---|---|---|---|---|
| 4,989,712 | A * | 2/1991 | Janiszewski | F16D 1/06 464/160 |
| 5,632,568 | A * | 5/1997 | Fechter | F16D 1/116 403/359.5 |
| 7,909,702 | B2 * | 3/2011 | Nishio | F16D 1/116 403/359.5 |
| 8,012,030 | B2 * | 9/2011 | Cermak | F16D 1/116 464/182 |
| 8,025,454 | B2 * | 9/2011 | Cermak | F16D 1/116 403/359.5 |
| 8,262,490 | B2 * | 9/2012 | Langer | F16D 1/116 403/359.5 |
| 8,277,330 | B2 * | 10/2012 | Szentmihalyi | F16D 1/116 464/182 |
| 8,322,941 | B2 * | 12/2012 | Cermak | F16D 1/116 403/359.5 |
| 8,425,141 | B2 * | 4/2013 | Disser | F16D 1/116 403/359.5 |
| 8,425,142 | B2 * | 4/2013 | Disser | F16D 1/116 403/359.5 |
| 8,672,110 | B2 * | 3/2014 | Jaeger | F16D 7/048 464/37 |
| 9,175,730 | B2 * | 11/2015 | Haas | F16D 1/033 |
| 9,828,945 | B2 * | 11/2017 | Russ | F03D 9/32 |
| 10,151,352 | B2 * | 12/2018 | Creek | F16D 1/116 |
| 10,253,819 | B2 * | 4/2019 | Sherlock | F16D 1/116 |
| 10,436,294 | B2 * | 10/2019 | Fukuda | F16D 1/116 |
| 10,927,899 | B2 * | 2/2021 | Janakiraman | F16D 1/116 |
| 11,199,138 | B2 * | 12/2021 | Garabello | F16D 1/116 |
| 2017/0114876 | A1 | 4/2017 | Fukuda et al. | |
| 2018/0128322 | A1 * | 5/2018 | Etzold | F16D 1/116 |

FOREIGN PATENT DOCUMENTS

| | | | | |
|---|---|---|---|---|
| DE | 102014109473 A1 * | 1/2016 | | F16D 1/116 |
| DE | 102014118397 A1 * | 6/2016 | | F16D 1/116 |
| FR | 3012543 A1 | 5/2015 | | |

* cited by examiner

GENERATOR SHAFT ASSEMBLY

CROSS-REFERENCE TO RELATED APPLICATIONS

This application claims priority to and the benefit of U.S. Provisional Application No. 63/028,501, filed May 21, 2020, the entire contents of which are herein incorporated by reference in their entirety.

BACKGROUND

Technological Field

The present disclosure relates to a generator shaft, and more particularly to a disconnect shaft assembly.

Description of Related Art

Generator shafts are typically coupled to a prime mover from a first end and to a generator from a second end. A generator shaft typically includes a disconnect shaft within the primary shaft in order to provide an engagement and disengagement function to the generator shaft. It is important to ensure proper functionality of this feature. Although conventional methods and assemblies have generally been considered satisfactory for their intended purpose, there is still a need in the art for a generator shaft assembly having improved reliability. There also remains a need in the art for such assemblies and components that are economically viable. The present disclosure may provide a solution for at least one of these remaining challenges.

SUMMARY OF THE INVENTION

A generator shaft assembly includes a primary shaft, a disconnect shaft housed within the primary shaft wherein a first end of the disconnect shaft is configured to couple with the primary mover and a second end of the disconnect shaft is configured to mate with the generator. The disconnect shaft sits inside the primary shaft. A retainer ring is housed within the primary shaft having at least a landing and a groove on an inner surface thereof and a retainer member is positioned between the landing of the retainer ring and an outer surface of the disconnect shaft configured to limit axial motion of the disconnect shaft relative to the primary shaft.

The retainer ring can include an inner flange projecting radially inward adjacent to a side facing the first end of the primary shaft of the landing, and an outer flange projecting radially inward adjacent to a side facing the second end of the primary shaft of the landing. The retainer member can be seated within a groove of the disconnect shaft which is defined by two splines of the disconnect shaft. A radially outward surface of the retainer member can have a diameter larger than an inward diameter of an adjacent primary shaft spline. An adjacent primary shaft spline is an axially closest spline to the second end of the disconnect shaft.

The retainer member can include at least two separate segments, each extending along at least a 170 degree arch. Also, a snap ring can be seated within the retainer ring. The snap ring does not contact the disconnect shaft. Specifically, the snap ring can be seated within the groove of the retainer ring.

The disconnect shaft can include at least one spline having an outer diameter further radially outward than an inner diameter of at least one primary shaft spline and further axially inward than the retainer member. At least one axial cross-section of the primary shaft can asymmetric. The retainer member can include 300 m steel.

A method of assembling the generator shaft includes inserting a disconnect shaft into a primary shaft from a first end, inserting a retainer ring into the primary shaft from a second end, and inserting a keeper member between the retainer ring and the disconnect shaft in order to limit a motion of the disconnect shaft relative to the primary shaft. The disconnect shaft can be pressed further towards the second end such that a portion of the disconnect shaft protrudes past the second end of the primary shaft before the retainer ring is inserted. The disconnect shaft can be placed fully within the primary shaft after the keeper member is seated between the retainer ring and the disconnect shaft. A snap ring can be seated between the retainer ring and the disconnect shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
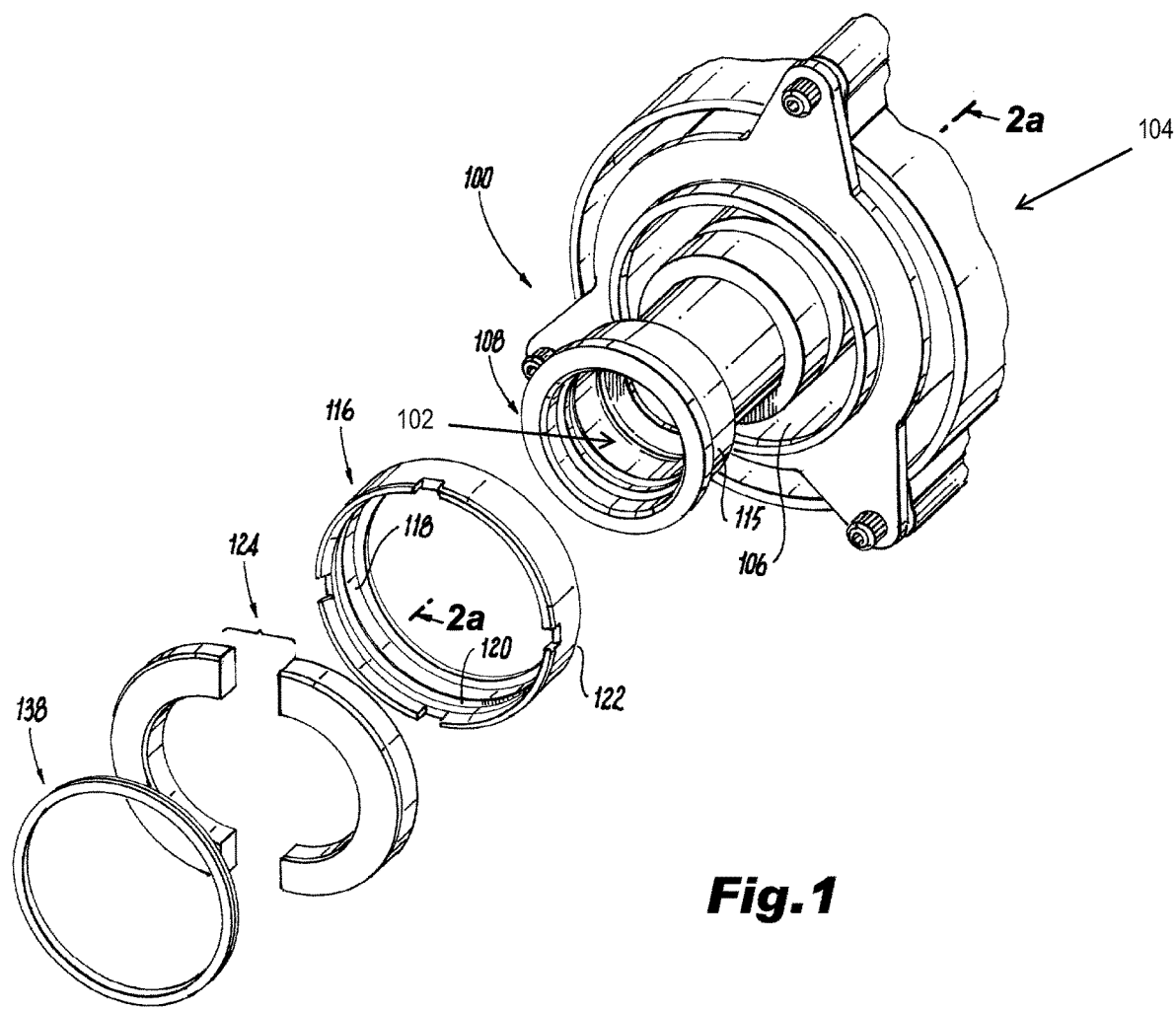
FIG. 1 is an exploded view of a generator shaft, showing an un-installed retainer ring.
Figure 2A:
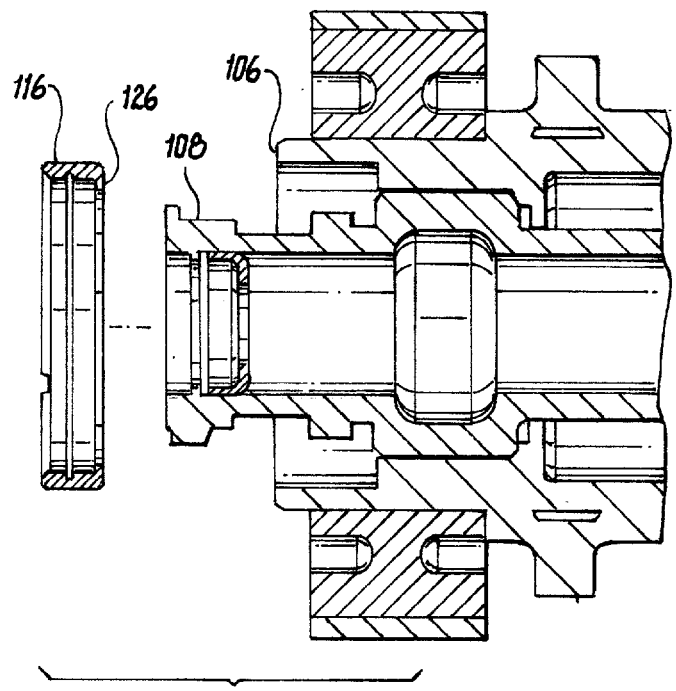
FIG. 2a-d are a cross-section view of the generator shaft of FIG. 1, showing an installation of the retainer ring and retainer member.
Figure 2B:
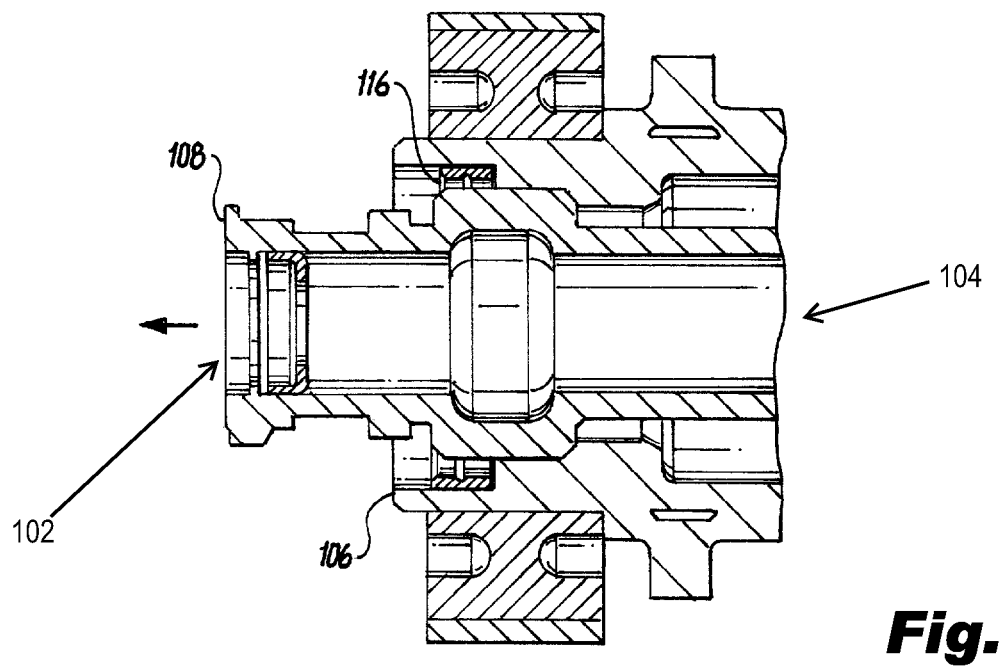
Figure 2C:
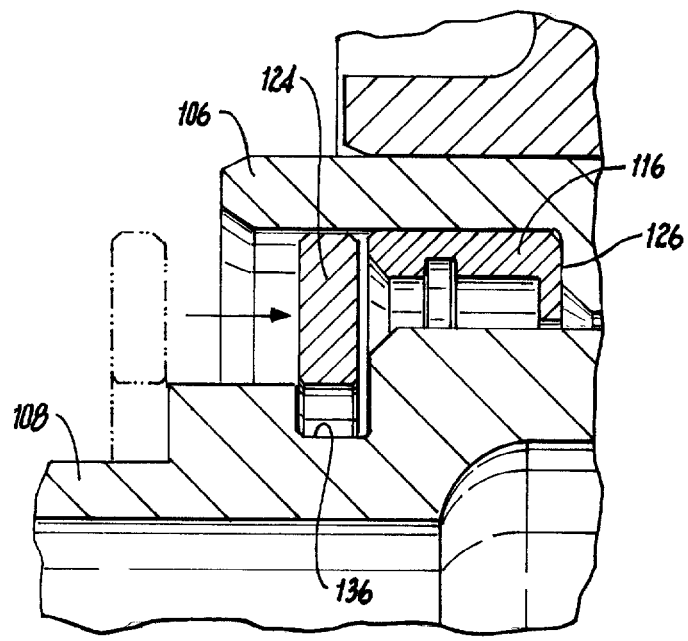
Figure 2D:
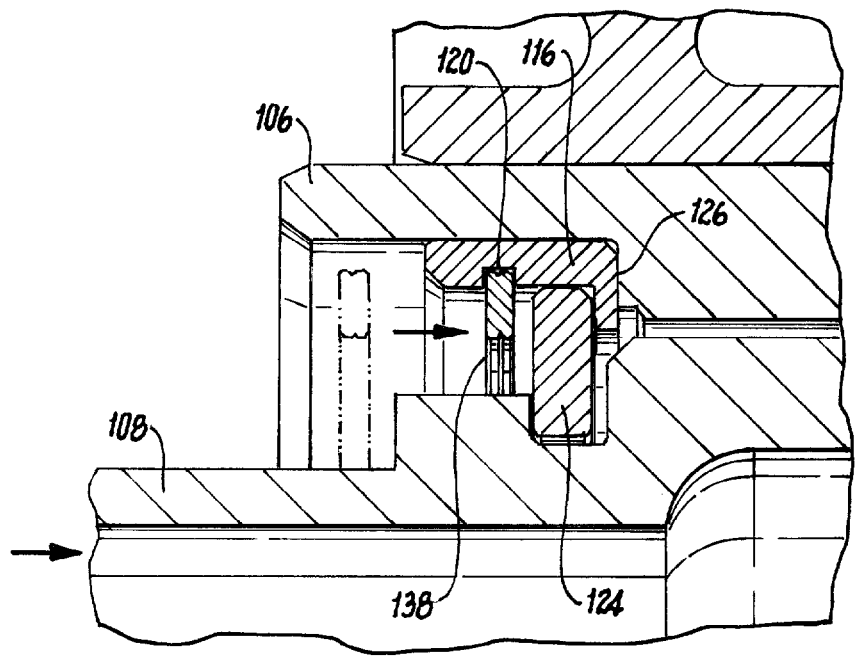

Reference will now be made to the drawings wherein like reference numerals identify similar structural features or aspects of the subject invention. For purposes of explanation and illustration, and not limitation, a partial view of an exemplary embodiment of a generator assembly in accordance with the invention is shown in FIG. 1 and is designated generally by reference character 100. Other embodiments of the generator shaft assembly in accordance with the invention, or aspects thereof, are provided in FIGS. 2a-2d, as will be described. The methods and systems of the invention can be used to provide added stability and reliability to the generator.

FIG. 1 shows a rotor assembly 100 of a generator having a first end 102 and a second end 104 configured to be pointed towards a gearbox. In order to allow disengagement from the gearbox when required the shaft assembly 100 is partially restricted in motion. The exploded view of the rotor assembly 100 shows a primary shaft 106 and disconnecting shaft 108 located inside the primary shaft 106. The disconnect shaft 108 is intended to move axially within the primary shaft 106 and engage and disengage from the gearbox. FIG. 1 further shows a retainer ring 116 and a keeper member 124 configured to be inserted between the retainer ring 116 and the disconnect shaft 108. The retainer ring 116 is housed within the primary shaft 106. The retainer ring 116 includes a landing 118 and a groove 120 on an inner surface and a flat outer surface on the outer surface 122. The retainer member 124 is seated between the landing 118 and the outer surface 115 of the disconnect shaft 108. The retainer member 124 limits limit axial motion of the disconnect shaft 108 relative to the primary shaft 106.

FIGS. 2a-2d, show an insertion procedure of the retainer ring 116 and the retainer member onto the disconnect shaft 108 and into the primary shaft 106. The retainer ring 116 includes an inner flange 126 projecting radially inward, which restricts the movement of the retainer member 124. The retainer member 124 is seated within a groove 136 of the disconnect shaft 108. As seen in FIG. 3a, when the disconnect shaft 108 is pressed such that a portion of the disconnect shaft protrudes past an end of the primary shaft 106, the retainer ring 116 is moved inside the primary shaft 106 (FIG. 2b), the retainer member 124 is then moved inside the primary shaft 106 (FIG. 2c), dropped inside the groove 136. The purpose of the retainer ring 116 is to prevent the disconnect shaft 108 from moving to toward the gearbox and not allowing a disconnect to occur. The retainer member 124 includes two separate segments (shown in FIG. 1), each extending in an arch creating a full circle. The retainer member 124 can include 300 m steel. A snap ring 138 can be seated within the retainer ring 116. The snap ring 138 does not contact the disconnect shaft 108. Specifically, the snap ring 138 is seated within the groove 134 of the retainer ring 116.

The methods and systems of the present disclosure, as described above and shown in the drawings, provide for a generator shaft with superior properties including increased reliability. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A generator shaft assembly comprising:
a primary shaft;
a disconnect shaft housed within the primary shaft, wherein an end of the disconnect shaft is configured to mate to a gearbox;
a retainer ring housed within the primary shaft having at least a landing and a groove on an inner surface thereof, wherein the retainer ring includes an inner flange projecting radially inward of the landing adjacent to a side facing the first end of the primary shaft; and
a retainer member positioned between the landing of the retainer ring and an outer surface of the disconnect shaft configured to limit axial motion of the disconnect shaft relative to the primary shaft, wherein the inner flange is axially between the primary shaft and the retainer member.

2. The assembly of claim 1, wherein the retainer ring includes an outer flange projecting radially inward of the landing adjacent to a side facing the second end of the primary shaft.

3. The assembly of claim 2, wherein the retainer member is seated within a ledge of the disconnect shaft.

4. The assembly of claim 1, wherein the retainer member is seated within a ledge of the disconnect shaft.

5. The assembly of claim 1, wherein the retainer member comprises at least two separate segments.

6. The assembly of claim 1, wherein the retainer member extends at least along a 170 degree arch.

7. The assembly of claim 1, further comprising a snap ring seated within the retainer ring.

8. The assembly of claim 7, wherein the snap ring does not contact the disconnect shaft.

9. The assembly of claim 7, wherein the snap ring is seated within the groove of the retainer ring.

10. The assembly of claim 1, wherein at least one axial cross-section of the disconnect shaft is asymmetric.

11. The assembly of claim 1, wherein the member is formed from a material comprising 300 m steel.

12. A method of assembly of a generator shaft comprising the steps of:
inserting a disconnect shaft into a primary shaft from a first end;
inserting a retainer ring into the primary shaft from a second end;
inserting a retainer member between a landing of the retainer ring and an outer surface of the disconnect shaft; and
inserting a keeper member between the retainer ring and the disconnect shaft in order to limit a motion of the disconnect shaft relative to the primary shaft, wherein an inner flange is axially between the primary shaft and the retainer member.

13. The method of claim 12, wherein the disconnect shaft is pressed further towards the second end such that a portion of the disconnect shaft protrudes past the second end of the primary shaft before the retainer ring is inserted.

14. The method of claim 12, wherein a snap ring is seated between the retainer ring and the disconnect shaft.

* * * * *